United States Patent
Ko et al.

(10) Patent No.: US 8,263,426 B2
(45) Date of Patent: Sep. 11, 2012

(54) HIGH-SENSITIVITY Z-AXIS VIBRATION SENSOR AND METHOD OF FABRICATING THE SAME

(75) Inventors: Sang Choon Ko, Daejeon (KR); Chi Hoon Jun, Daejeon (KR); Byoung Gon Yu, Daejeon (KR); Chang Auck Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 465 days.

(21) Appl. No.: 12/509,360

(22) Filed: Jul. 24, 2009

(65) Prior Publication Data

US 2010/0132467 A1   Jun. 3, 2010

(30) Foreign Application Priority Data

Dec. 3, 2008 (KR) .................. 10-2008-0121910
Apr. 1, 2009 (KR) .................. 10-2009-0028248

(51) Int. Cl.
*H01L 21/00* (2006.01)

(52) U.S. Cl. ............. 438/53; 438/689; 257/415

(58) Field of Classification Search .......... None
See application file for complete search history.

(56) References Cited

U.S. PATENT DOCUMENTS

| | | | | |
|---|---|---|---|---|
| 6,100,103 A * | 8/2000 | Shim et al. | ....... | 438/26 |
| 6,156,585 A * | 12/2000 | Gogoi et al. | ....... | 438/48 |
| 6,391,673 B1 * | 5/2002 | Ha et al. | ....... | 438/51 |
| 6,490,915 B2 * | 12/2002 | Yamada et al. | ....... | 73/114.34 |
| 7,036,373 B2 | 5/2006 | Johnson et al. | | |
| 7,069,789 B2 | 7/2006 | Tokunaga et al. | | |
| 7,190,038 B2 * | 3/2007 | Dehe et al. | ....... | 257/415 |
| 7,305,096 B2 * | 12/2007 | Su et al. | ....... | 381/174 |
| 7,449,356 B2 * | 11/2008 | Weigold | ....... | 438/53 |

(Continued)

FOREIGN PATENT DOCUMENTS

| | | |
|---|---|---|
| EP | 1808672 A2 | 7/2007 |
| JP | 2004-354061 | 12/2004 |
| KR | 10-2001-0082610 A | 8/2001 |
| KR | 10-2006-0045722 A | 5/2006 |
| KR | 10-2007-0026860 A | 3/2007 |
| KR | 1020080073723 A | 8/2008 |

OTHER PUBLICATIONS

Anke Sanz-Velasco et al., "Sensors and actuators based on SOI materials", Solid State Electronics, 2006, pp. 865-876, Sweden.

*Primary Examiner* — Evan Pert
*Assistant Examiner* — Andres Munoz (57) ABSTRACT

Provided is a high-sensitivity MEMS-type z-axis vibration sensor, which may sense z-axis vibration by differentially shifting an electric capacitance between a doped upper silicon layer and an upper electrode from positive to negative or vice versa when center mass of a doped polysilicon layer is moved due to z-axis vibration. Particularly, since a part of the doped upper silicon layer is additionally connected to the center mass of the doped polysilicon layer, and thus an error made by the center mass of the doped polysilicon layer is minimized, it may sensitively respond to weak vibration of low frequency such as seismic waves. Accordingly, since the high-sensitivity MEMS-type z-axis vibration sensor sensitively responds to a small amount of vibration in a low frequency band, it can be applied to a seismograph sensing seismic waves of low frequency which have a very small amount of vibration and a low vibration speed. Moreover, since the high-sensitivity MEMS-type z-axis vibration sensor has a higher vibration sensibility than MEMS-type z-axis vibration sensor of the same size, it can be useful in electronic devices which are gradually decreasing in size.

8 Claims, 10 Drawing Sheets

U.S. PATENT DOCUMENTS

| | | |
|---|---|---|
| 7,536,769 B2 * | 5/2009 | Pedersen .................... 29/594 |
| 2003/0200805 A1 | 10/2003 | Ishikawa et al. |
| 2005/0237132 A1 * | 10/2005 | Sano et al. ................... 333/189 |
| 2006/0272413 A1 | 12/2006 | Vaganov et al. |
| 2007/0154040 A1 * | 7/2007 | Chen ............................ 381/174 |
| 2008/0053229 A1 | 3/2008 | Gogoi et al. |
| 2008/0142014 A1 | 6/2008 | Jiang |
| 2008/0233752 A1 * | 9/2008 | Ko et al. ....................... 438/700 |
| 2009/0026561 A1 * | 1/2009 | Reichenbach et al. ........ 257/416 |

* cited by examiner

HIGH-SENSITIVITY Z-AXIS VIBRATION SENSOR AND METHOD OF FABRICATING THE SAME

CROSS-REFERENCE TO RELATED APPLICATION

This application claims priority to and the benefit of Korean Patent Application Nos. 10-2008-0121910, filed Dec. 3, 2008 and 10-2009-0028248, filed Apr. 1, 2009, the disclosures of which are incorporated herein by reference in their entirety.

BACKGROUND

1. Field of the Invention

The present invention relates to a high-sensitivity MEMS-type z-axis vibration sensor and a method of fabricating the same, and more particularly, to a MEMS-type z-axis vibration sensor that is capable of sensing low vibration in a low frequency band by minimizing an error made by center mass by adding a part of an upper silicon layer of an SOI substrate to the center mass of a center ground electrode, and a method of fabricating the same.

2. Discussion of Related Art

Micro-electromechanical systems (MEMS) refer to the integration of mechanical elements, sensors, actuators, and electronics on a silicon substrate through microfabrication technology.

The MEMS technology is applied to various fields. Since MEMS-type vibration sensors (acceleration sensors) have been applied to gaming and mobile phones, they are closely affecting everyday life in recent times.

However, the MEMS-type vibration sensors which have been developed so far are mostly comb-drive type x- or y-axis vibration sensors sensing lateral vibration. There has been little research on z-axis vibration sensors sensing vertical vibration.

Particularly, MEMS-type z-axis vibration sensors which have been developed so far are well suited to constantly vibrating environments such as an automobile, but are not suited to an environment having very low vibration in a low frequency band and a low vibration speed like seismic waves. This is because the development of the MEMS technology has made it possible to scale down devices, but as a sensor becomes smaller, a sensitivity characteristic to a low frequency wave becomes worse.

Therefore, there is a need of a MEMS-type z-axis vibration sensor which is capable of sensibly responding to low vibration in a low frequency band.

SUMMARY OF THE INVENTION

The present invention is directed to a high-sensitivity MEMS-type z-axis vibration sensor which is capable of sensing low vibration in a low frequency band, and a method of fabricating the same.

One aspect of the present invention provides a high-sensitivity MEMS-type z-axis vibration sensor, which senses z-axis vibration by differentially shifting an electric capacitance between an upper electrode and a lower electrode formed above and below a center ground electrode from positive to negative or vice versa according to a change of center mass of the center ground electrode due to vibration. A part of the lower electrode is additionally connected to the center mass of the center ground electrode to increase the size of the center mass of the center ground electrode.

Another aspect of the present invention provides a method of fabricating a high-sensitivity MEMS-type z-axis vibration sensor, including: preparing an SOI substrate, and doping an upper silicon layer of the SOI substrate to be used as a lower electrode with impurities; forming an oxide layer of a predetermined thickness and a polysilicon layer to be used as a center ground electrode above the doped upper silicon layer, and doping the polysilicon layer with impurities; forming a sacrificial oxide layer of a predetermined thickness and an upper electrode above the doped polysilicon layer; etching a silicon wafer below the SOI substrate and isolating a region to be additionally connected to center mass of the center ground electrode from the doped upper silicon layer; and etching the sacrificial oxide layer and the oxide layer through an upper surface of the upper electrode, and forming a vibration space in which the doped polysilicon layer is capable of vibrating in a z-axis direction.

In preparing the SOI substrate, the upper silicon layer of the SOI substrate may be doped with $POCl_3$ of high concentration to have conductivity.

In forming the oxide layer, a silicon dummy ring may be formed above the doped upper silicon layer to define a region to be additionally connected to the center mass of the center ground electrode, and the oxide layer may be formed to a predetermined thickness above the upper silicon layer having the silicon dummy ring. The polysilicon layer to be used as the center ground electrode may be formed above the oxide layer, and then the polysilicon layer may be doped with $POCl_3$ of high concentration to have conductivity.

Here, a second upper oxide layer may be formed above the upper silicon layer having the silicon dummy ring, a predetermined PSG layer may be formed to increase an etch rate of the oxide layer in etching the sacrificial oxide layer by doping the second upper oxide layer with $POCl_3$, and a third oxide layer may be formed above the predetermined PSG layer.

In forming the sacrificial oxide layer, the sacrificial oxide layer may be formed to a predetermined thickness above the doped polysilicon layer and then patterned, and a second metal layer made of titanium or platinum may be formed above the patterned sacrificial oxide layer. The upper electrode may be formed by plating an upper surface of the second metal layer with nickel or gold, and then a third metal layer made of titanium or platinum may be formed above the upper electrode.

In etching the silicon wafer below the SOI substrate, the silicon wafer below the SOI substrate may be wet-etched to expose a thermal oxide layer of the SOI substrate, and the exposed thermal oxide layer may then be wet-etched. The exposed thermal oxide layer may be wet-etched until the silicon dummy ring is separated from the doped upper silicon layer, so that a region to be additionally connected to center mass of the center ground electrode can be isolated from the doped upper silicon layer.

Meanwhile, the entire structure obtained in etching the sacrificial oxide layer and the oxide layer may be mounted on a TO can-type or SMD-type package and fixed thereto and then vacuum-packaged.

BRIEF DESCRIPTION OF THE DRAWINGS

The above and other objects, features and advantages of the present invention will become more apparent to those of ordinary skill in the art by describing in detail preferred embodiments thereof with reference to the attached drawings in which.

DETAILED DESCRIPTION OF EXEMPLARY EMBODIMENTS

Hereinafter, a high-sensitivity MEMS-type z-axis vibration sensor and a method of fabricating the same will be described with reference to the accompanying drawings in detail.

Figure 1:
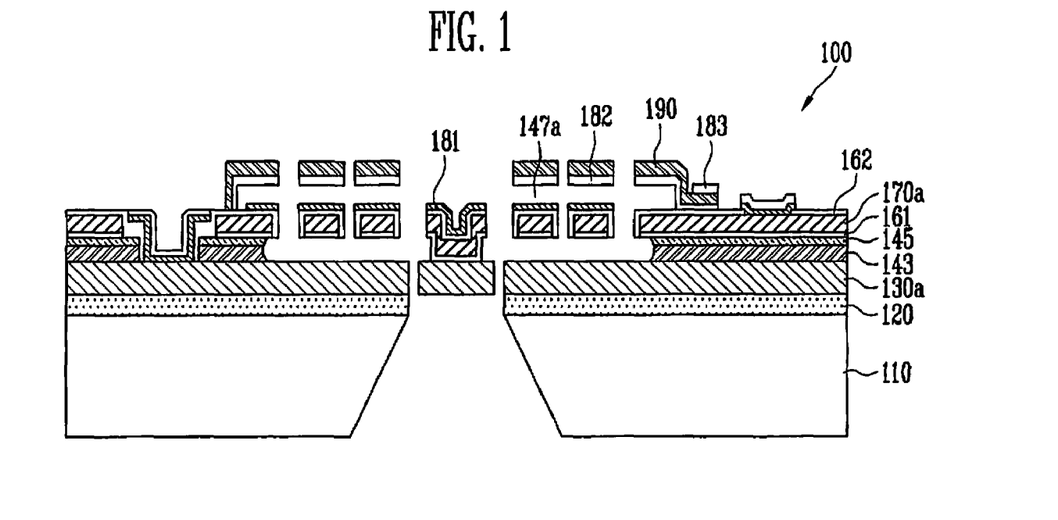
FIG. 1 is a view showing a high-sensitivity MEMS-type z-axis vibration sensor according to an exemplary embodiment of the present invention.

FIG. 1 is a view showing a high-sensitivity MEMS-type z-axis vibration sensor according to an exemplary embodiment of the present invention.

Referring to FIG. 1, a high-sensitivity MEMS-type z-axis vibration sensor 100 according to an exemplary embodiment of the present invention includes a center ground electrode 170a whose center mass is moved due to vibration between a lower electrode 130a and an upper electrode 190.

Accordingly, when the center mass of the center ground electrode 170a is moved due to vibration, an electric capacitance between the lower electrode 130a and the upper electrode 190 is differentially shifted from positive to negative or vice versa so that the vibration in a z-axis direction is sensed.

Here, the lower electrode 130a may be formed by doping an upper silicon layer of an SOI substrate with impurities, such that a thermal oxide layer 120 and a silicon wafer 110 are formed below the lower electrode 130a.

First and second nitride layers 161 and 162 are formed below and above the center ground electrode 170a, respectively, to protect the center ground electrode 170a and a first metal layer 181 made of titanium or platinum is formed above the second nitride layer 162. Further, second and third metal layers 182 and 183 made of titanium or platinum are formed below and above the upper electrode 190, respectively.

Particularly, the high-sensitivity MEMS-type z-axis vibration sensor 100 according to an exemplary embodiment of the present invention has a structure in which a part of the lower electrode 130a is additionally connected to the center mass of the center ground electrode 170a. Accordingly, an error made by the center mass of the center ground electrode 170a is minimized such that the sensor may sensitively respond to weak vibration of low frequency such as a seismic wave.

Such structural characteristics will be described in further detail with reference to a fabrication process.

Figure 2A:
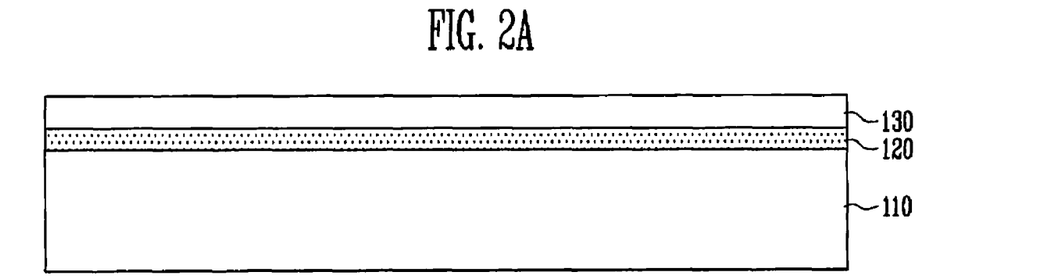
FIGS. 2A to 2Z are cross-sectional views showing a process of fabricating the high-sensitivity MEMS-type z-axis vibration sensor according to an exemplary embodiment of the present invention.
Figure 2B:
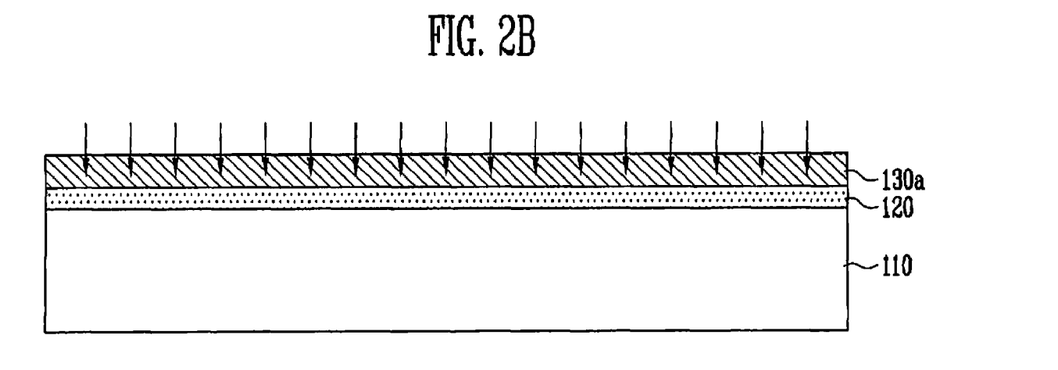
Figure 2C:
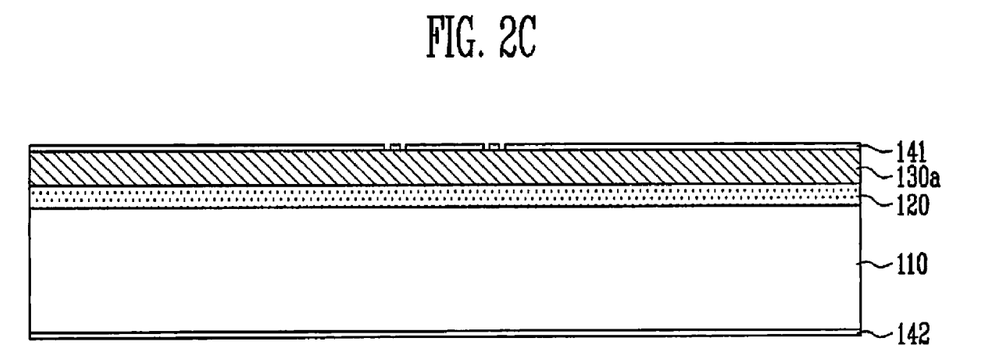
Figure 2D:
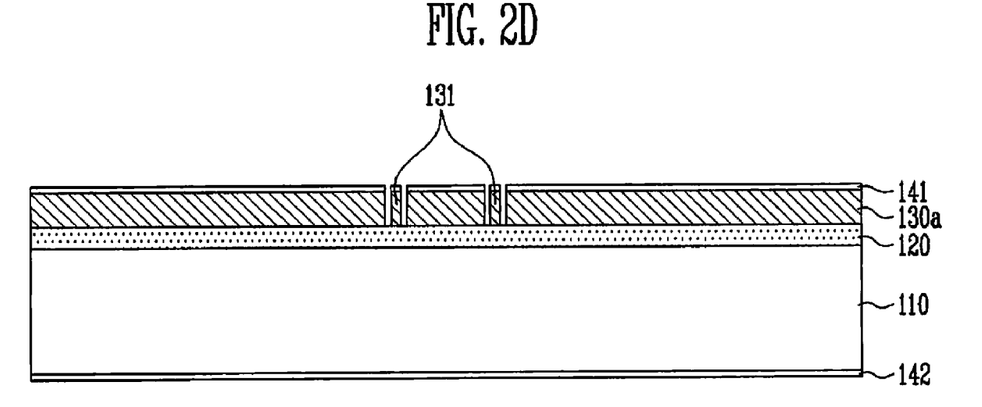
Figure 2E:
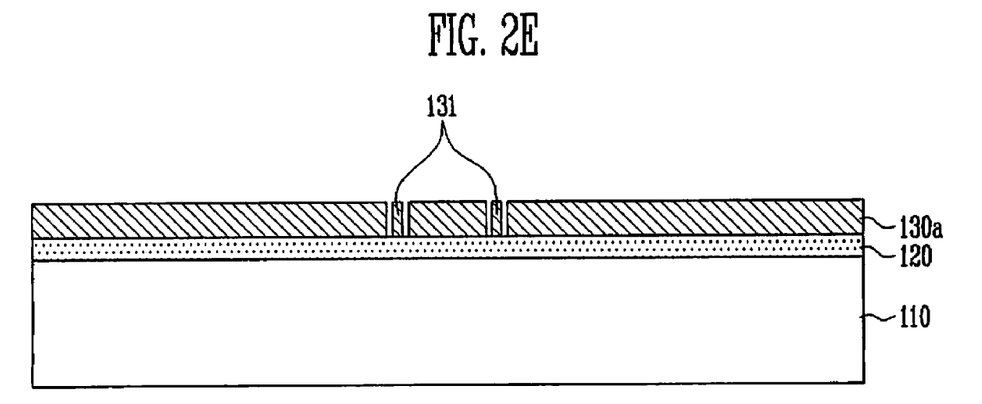
Figure 2F:
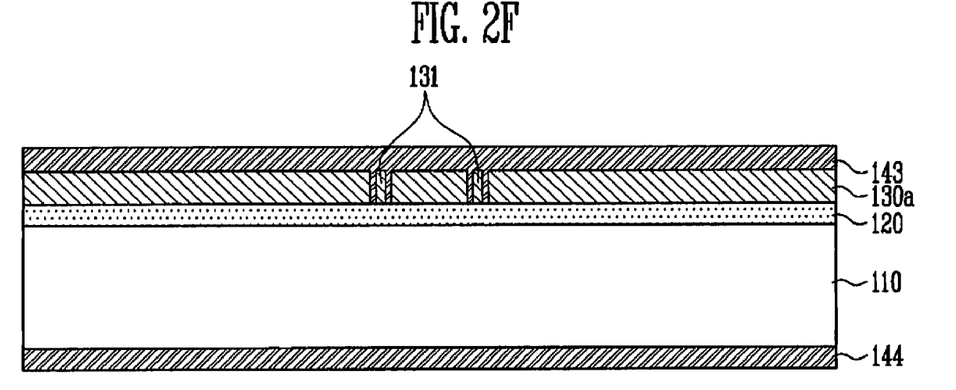
Figure 2G:
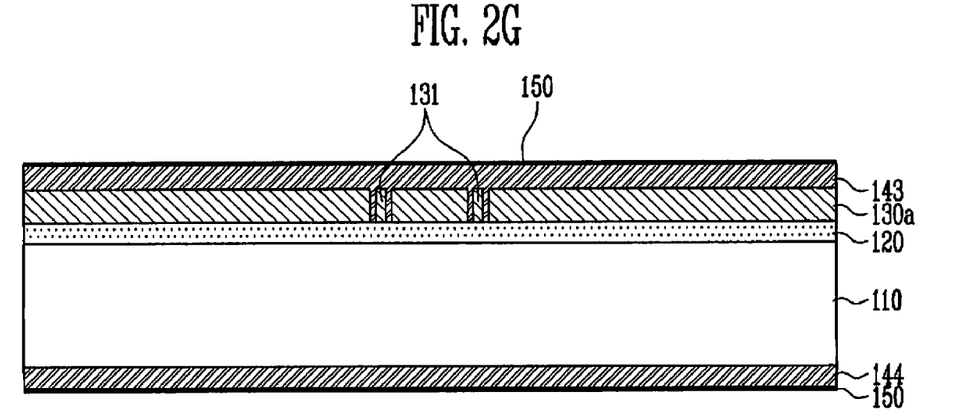
Figure 2H:
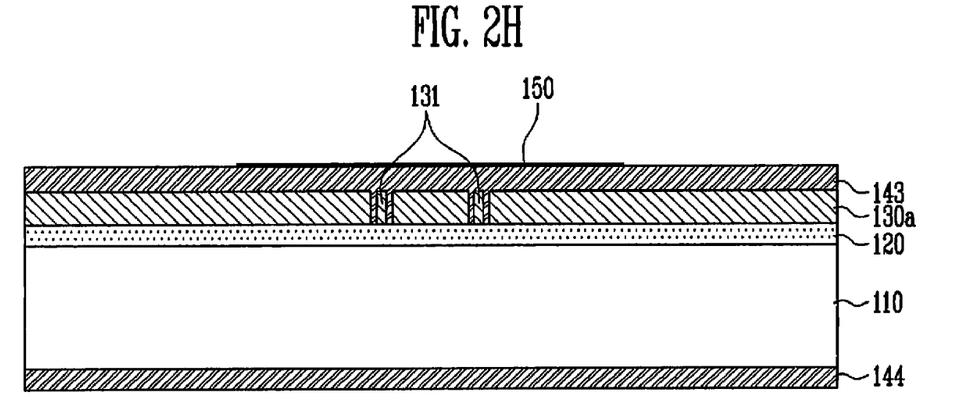
Figure 2I:
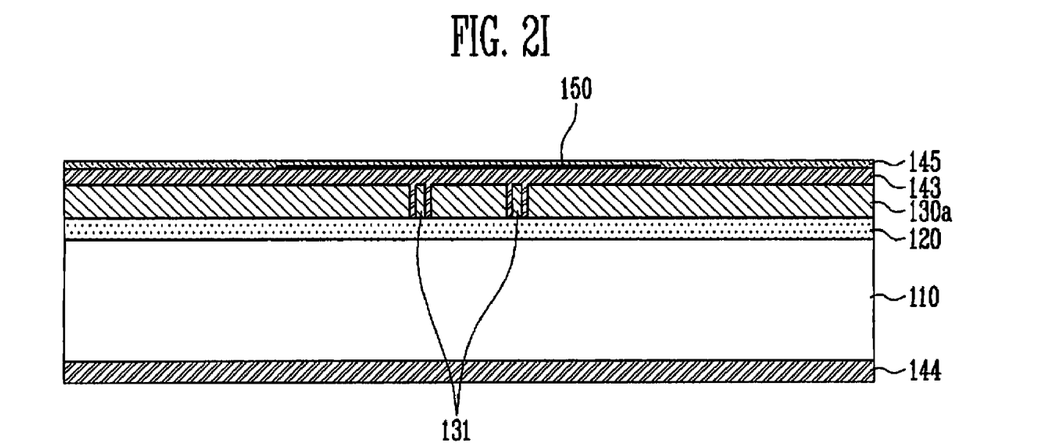
Figure 2J:
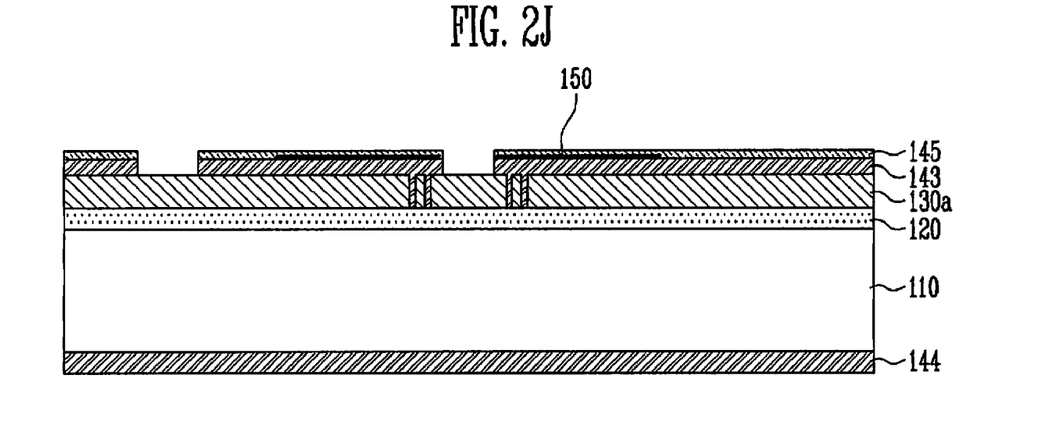
Figure 2K:
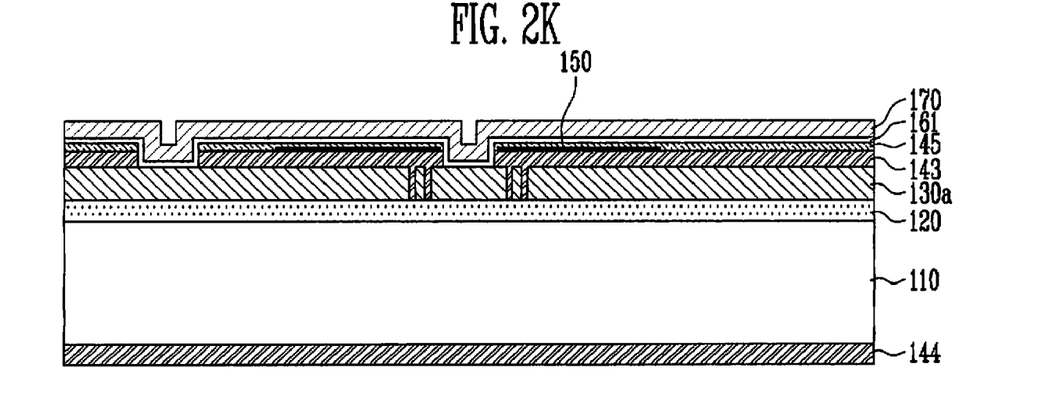
Figure 2L:
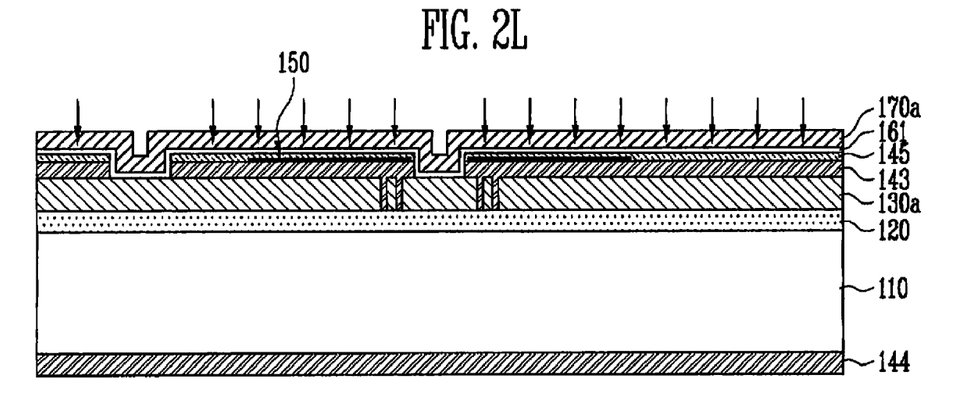
Figure 2M:
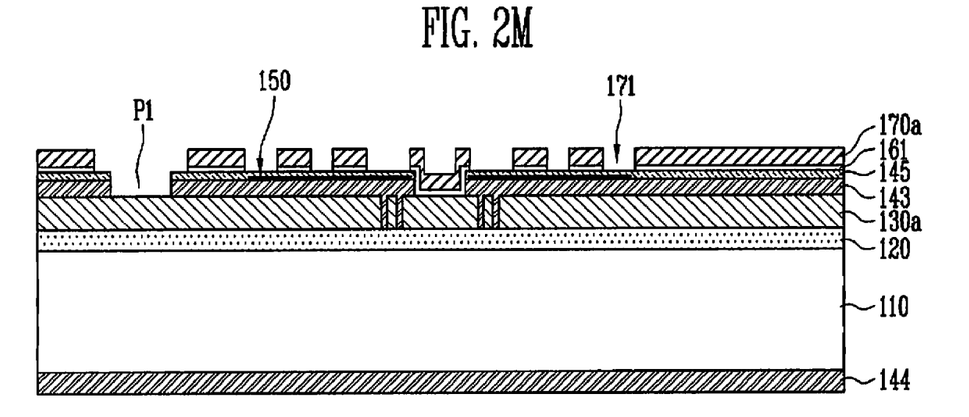
Figure 2N:
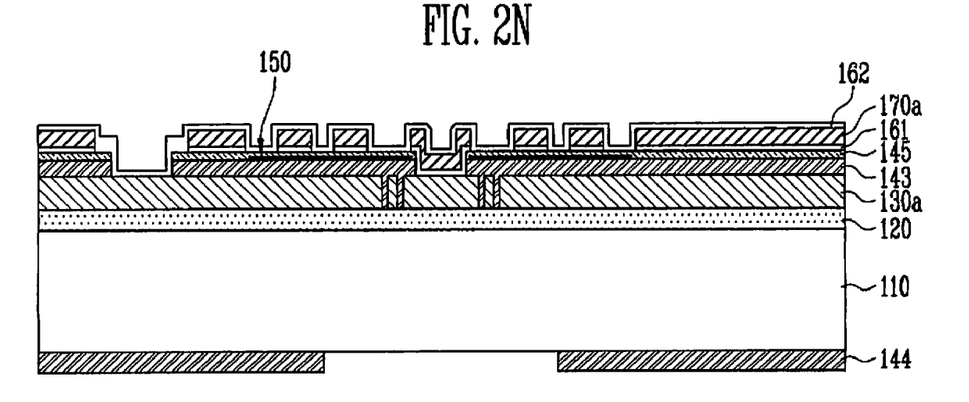
Figure 2O:
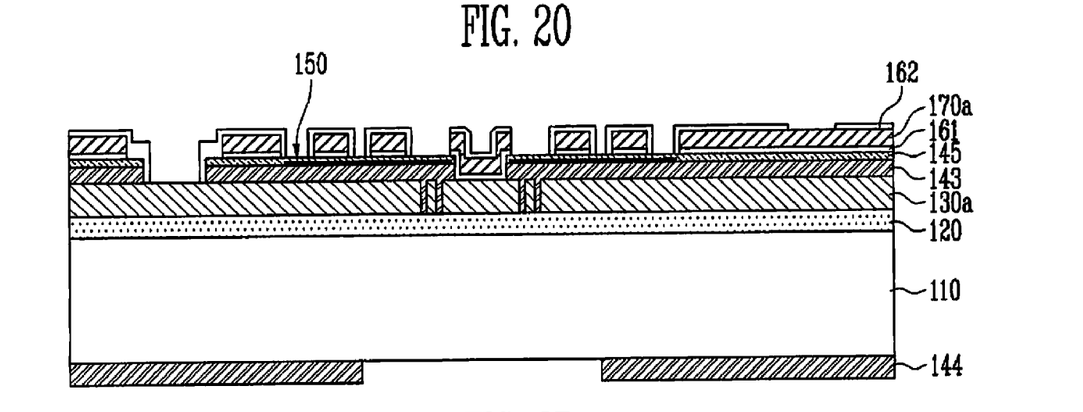
Figure 2P:
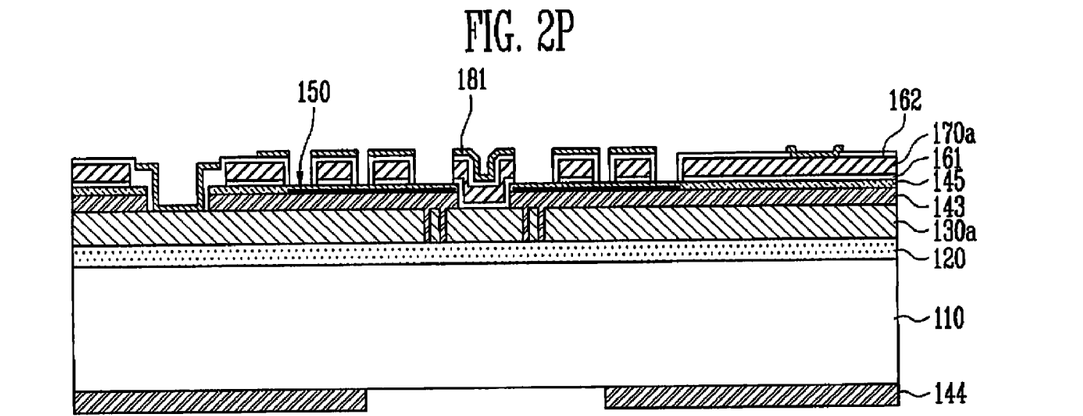
Figure 2Q:
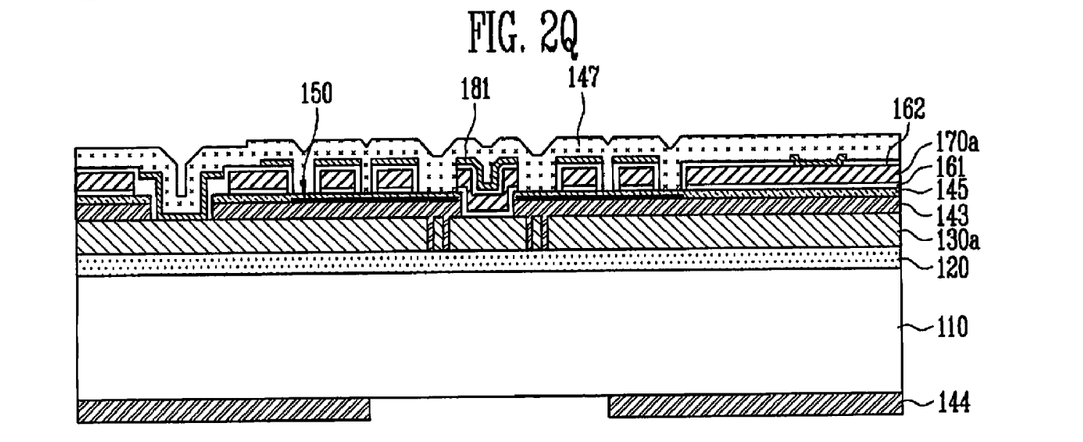
Figure 2R:
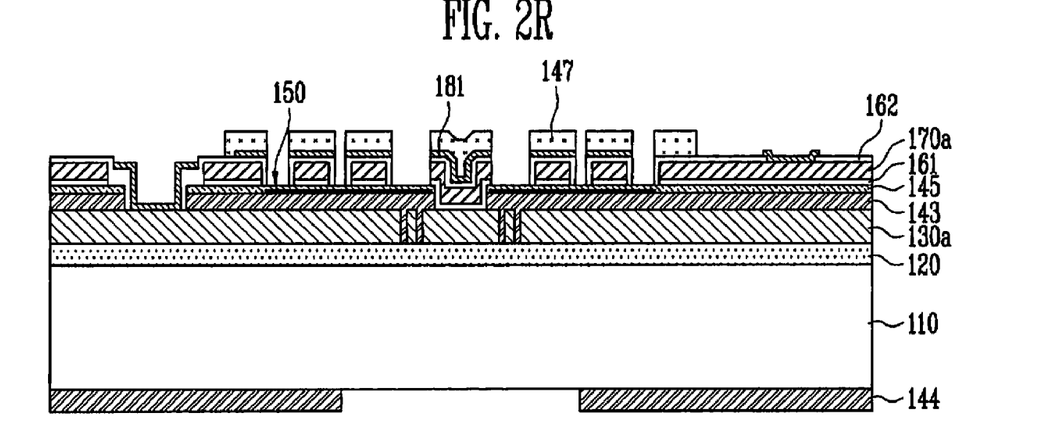
Figure 2S:
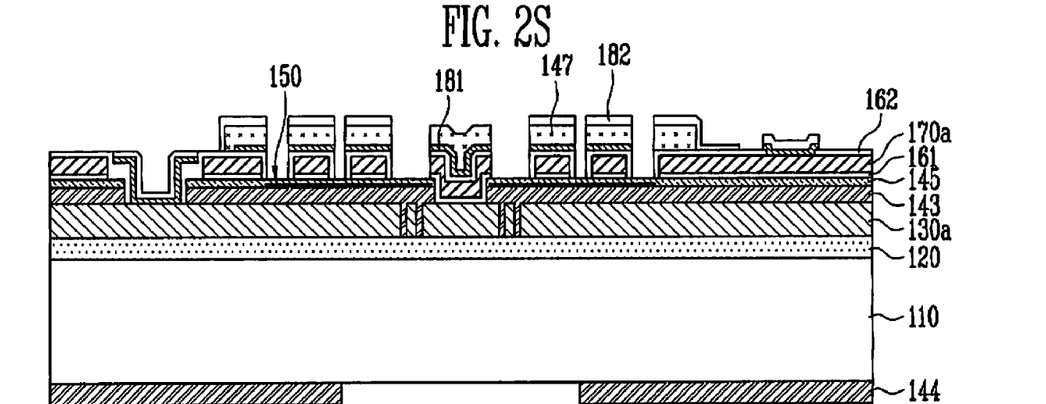
Figure 2T:
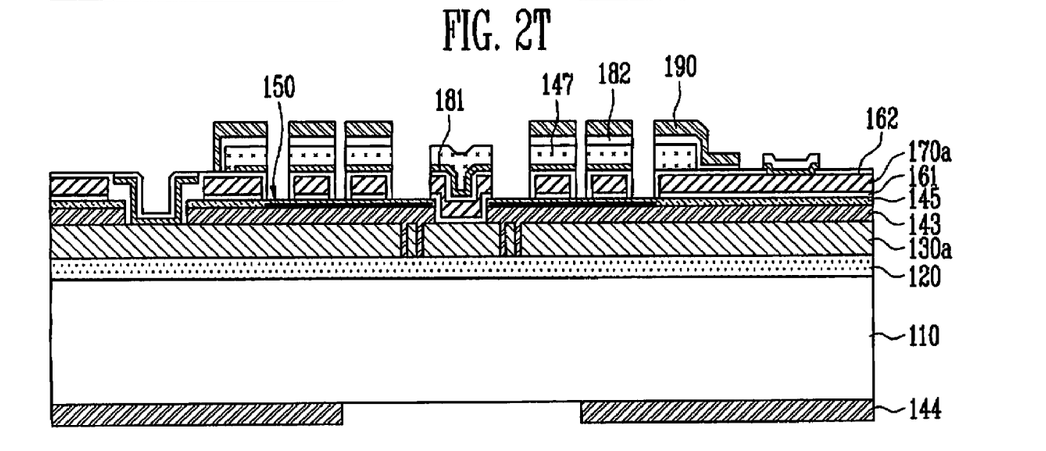
Figure 2U:
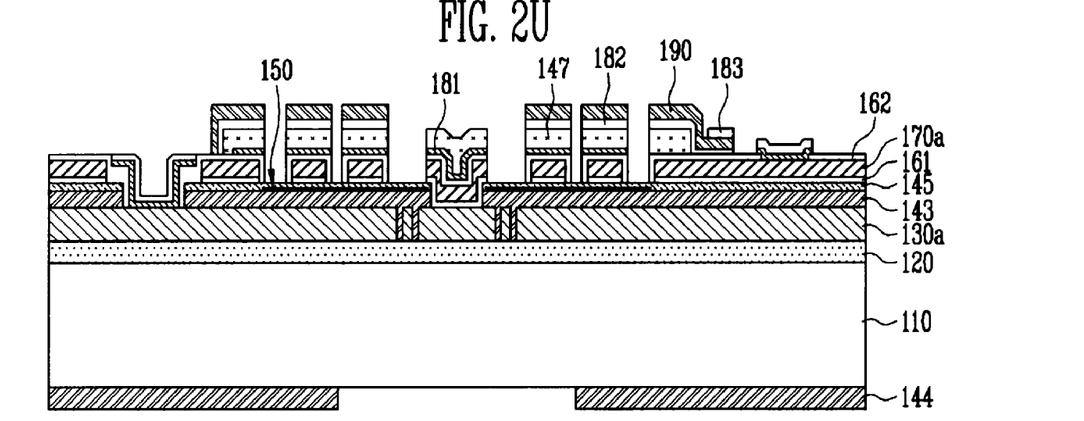
Figure 2V:
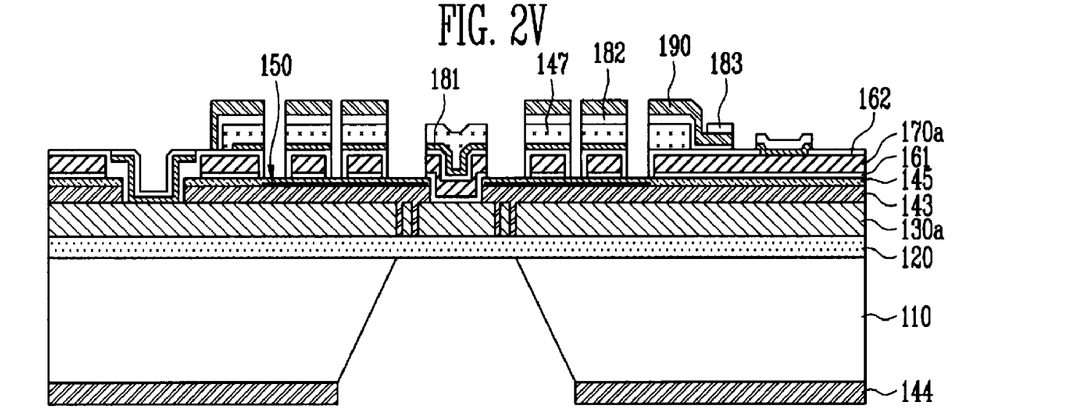
Figure 2W:
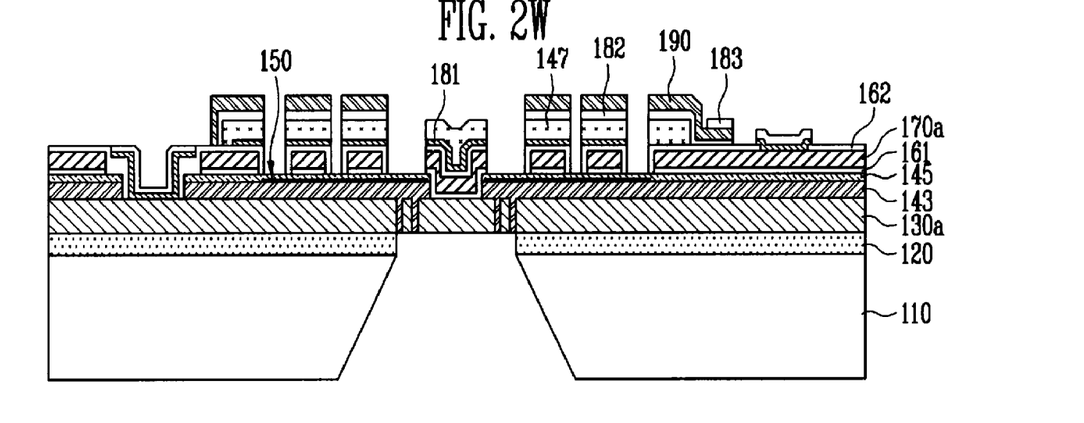
Figure 2X:
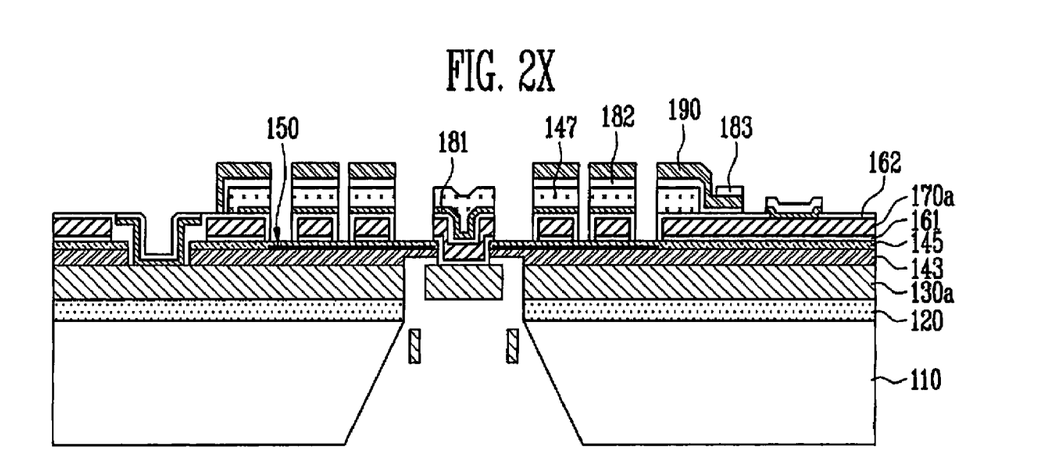
Figure 2Y:
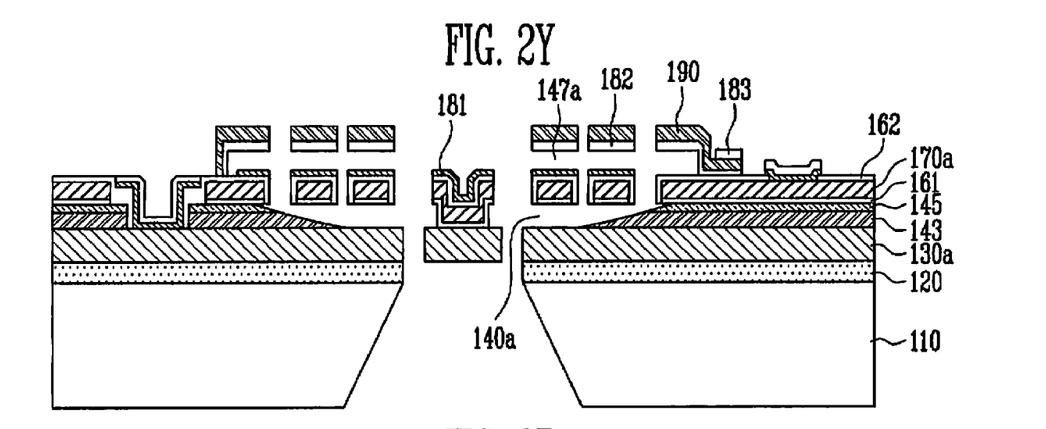
Figure 2Z:
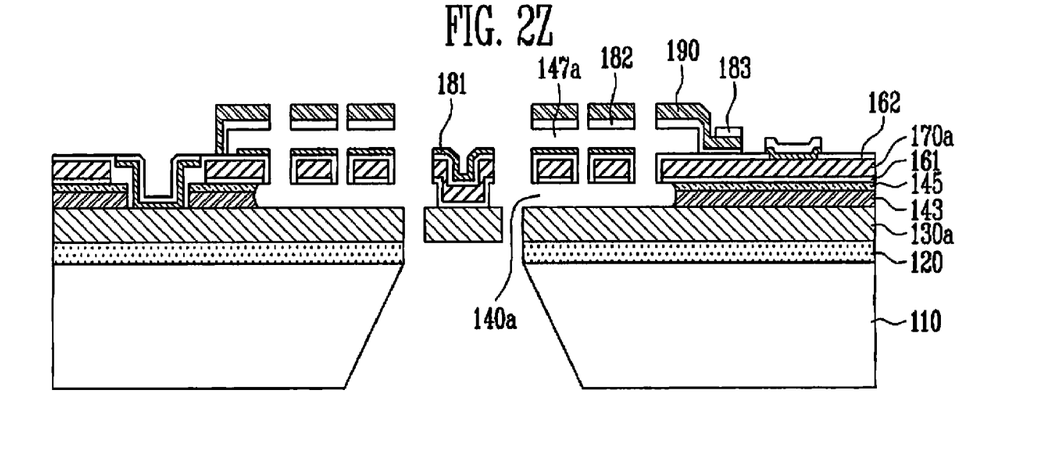

FIGS. 2A to 2Z are cross-sectional views showing a process of fabricating the high-sensitivity MEMS-type z-axis vibration sensor according to an exemplary embodiment of the present invention.

To begin with, as shown in FIG. 2A, a silicon on insulator (SOI) substrate in which a thermal oxide layer 120 and an upper silicon layer 130 are sequentially formed on a silicon wafer 110 is prepared.

Then, as shown in FIG. 2B, the upper silicon layer 130 is doped with $POCl_3$ of high concentration. The doped upper silicon layer 130a has conductivity and is used as a lower electrode.

Here, during the $POCl_3$ doping, a phosphosilicate glass (PSG) layer is formed above the upper silicon layer 130a, and may be completely removed using a fluoric acid aqueous solution before annealing at 900° C. for 30 minutes.

Subsequently, as shown in FIG. 2C, a first upper oxide layer 141 is formed above the doped upper silicon layer 130a, and patterned through photolithography. Here, during the formation of the first upper oxide layer 141, a first lower oxide layer 142 is formed below the silicon wafer 110.

Here, the first upper oxide layer 141 and the first lower oxide layer 142 may be low temperature oxide (LTO) layers.

As shown in FIG. 2D, the doped upper silicon layer 130a is etched by deep reactive ion etching (RIE) using the patterned first upper oxide layer 141 as an etch mask, thereby forming a silicon dummy ring 131 above the doped upper silicon layer 130a.

As shown in FIG. 2E, the first upper oxide layer 141 and the first lower oxide layer 142 are removed using a fluoric acid aqueous solution, thereby exposing the silicon dummy ring 131.

Here, the silicon dummy ring 131 is provided to define a region additionally connected to center mass of a center ground electrode, and eventually separated from the doped upper silicon layer 130a.

Then, as shown in FIG. 2F, a second upper oxide layer 143 is formed above the doped upper silicon layer 130a to fill grooves formed at right and left sides of the silicon dummy ring 131. Here, a second lower oxide layer 144 is formed below the silicon wafer 110. Here, the second upper oxide layer 143 and the second lower oxide layer 144 may be LTO layers.

Subsequently, as shown in FIG. 2G, the second upper oxide layer 143 and the second lower oxide layer 144 are doped with $POCl_3$, thereby forming a PSG layer 150, and as shown in FIG. 2H, regions other than a certain portion of the PSG layer 150 are removed through photolithography.

Here, the PSG layer 150 is used to increase an etch rate in a subsequent etching process using a fluoric acid aqueous solution.

As shown in FIG. 2I, a third upper oxide layer 145 is formed above the certain portion of the PSG layer 150, which is disposed between the second upper oxide layer 143 and the third upper oxide layer 145. Here, the third upper oxide layer 145 may be formed of LTO, and have a thickness of an air-gap to obtain desired vibration sensitivity.

Then, as shown in FIG. 2J, the third upper oxide layer 145, the PSG layer 150 and the second upper oxide layer 143 are patterned thorough photolithography to partially expose the doped upper silicon layer 130a.

As shown in FIG. 2K, a first nitride layer 161 is formed above the patterned third upper oxide layer 145 by low pressure chemical vapor deposition (LPCVD), and a polysilicon layer 170 which will be used as a center ground electrode and a membrane is formed thereabove. Here, the first nitride layer 161 may be formed of $Si_3N_4$.

As shown in FIG. 2L, the polysilicon layer 170 is doped with $POCl_3$. The doped polysilicon layer 170a has good electric conductivity, and is used as the center ground electrode.

Here, during the $POCl_3$ doping, the PSG layer is formed above the polysilicon layer 170a, and will be completely removed using a fluoric acid aqueous solution.

Subsequently, as shown in FIG. 2M, patterning is performed from the doped polysilicon layer 170a to the second upper oxide layer 143 through photolithography, thereby forming a contact pad region P1 of a lower electrode and an etch hole 171 which will be used for etching a sacrificial layer.

Then, as shown in FIG. 2N, a second nitride layer 162 is formed above the patterned polysilicon layer 170a by LPCVD.

Subsequently, as shown in FIG. 2O, the second nitride layer 162 is patterned through photolithography to open a contact pad region that will be connected to an upper electrode and a contact pad region that will be connected to the lower electrode. The second lower oxide layer 144 formed below the silicon wafer 110 is then patterned through photolithography.

As shown in FIG. 2P, a first metal layer 181 made of titanium or platinum is formed above the second nitride layer 162 using an electron beam deposition apparatus, and annealed in a nitrogen atmosphere at 400° C. for 20 minutes.

As shown in FIG. 2Q, a sacrificial oxide layer 147 that will be used as a sacrificial layer is formed to a predetermined thickness of an air gap above the first metal layer 181 by PECVD, and then is patterned through photolithography as shown in FIG. 2R.

As shown in FIG. 2S, a second metal layer 182 made of titanium or platinum is formed above the patterned sacrificial oxide layer 147 using the electron beam deposition apparatus.

Then, as shown in FIG. 2T, an upper electrode 190 is formed by plating an upper surface of the second metal layer 182 with thick nickel or gold by electron plating.

Subsequently, as shown in FIG. 2U, a third metal layer 183 made of titanium or platinum is formed above a pad portion of the upper electrode 190 using a stencil mask.

Then, as shown in FIG. 2V, a lower surface of the silicon wafer 110 is etched using a 90° C. TMAH solution by wet etching to expose the thermal oxide layer 120. Here, after the wet etching is completed, the silicon wafer 110 may be cleaned and then dried.

As shown in FIG. 2W, the exposed thermal oxide layer 120 is wet-etched using a 6:1 buffered oxide etch (BOE) solution.

As shown in FIG. 2X, the thermal oxide layer 120 is etched until the second upper oxide layer 143 is removed by a predetermined thickness, thereby separating the silicon dummy ring 131 from the doped upper silicon layer 130a.

Once the silicon dummy ring 131 is separated, a region of the upper silicon layer 130a defined by the silicon dummy ring 131, in other words, a region to be additionally connected to the center mass of the center ground electrode, is isolated from the doped upper silicon layer 130a.

Then, as shown in FIG. 2Y, a first vibration space 147a is formed between the upper electrode 190 and the doped polysilicon layer 170a, by wet etching the sacrificial oxide layer 147 using a fluoric acid aqueous solution through an upper surface of the upper electrode 190, and a second vibration space 140a is then formed between the doped polysilicon layer 170a and the doped upper silicon layer 130a by sequentially wet etching the third upper oxide layer 145, the PSG layer 150 and the second upper oxide layer 143.

Here, when the fluoric acid aqueous solution meets the PSG layer 150 in the wet etching process using the fluoric acid aqueous solution, an etch rate is rapidly increased, so that an etching time can be reduced.

Finally, as shown is FIG. 2Z, the third upper oxide layer 145 and the second upper oxide layer 143, which remain in the second vibration space 140a, are etched.

Through the above-described fabrication process, a MEMS-type z-axis vibration sensor capable of sensing z-axis vibration by differentially shifting an electric capacitance between the doped upper silicon layer 130a and the upper electrode 190 from positive to negative or vice versa when the center mass of the doped polysilicon layer 170a is changed by z-axis vibration can be fabricated.

In addition, since a part of the doped upper silicon layer 130a is additionally connected to the center mass of the doped polysilicon layer 170a, and thus an error made by the center mass of the doped polysilicon layer 170a is minimized, a MEMS-type z-axis vibration sensor capable of sensitively responding with respect to weak vibration of low frequency such as a seismic wave can be fabricated.

The MEMS-type z-axis vibration sensor can be applied to a microphone, which senses acoustic vibration in a z-axis direction and converts into electrical signal.

Figure 3:
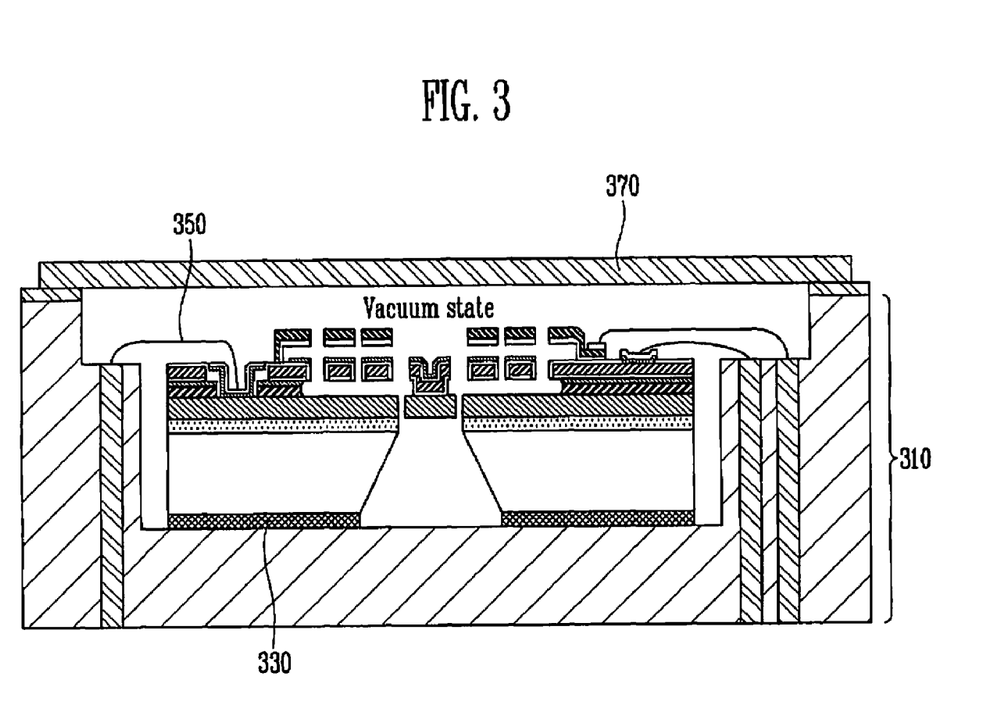
FIG. 3 is a view of the high-sensitivity MEMS-type z-axis vibration sensor that is packaged as a module according to an exemplary embodiment of the present invention.

FIG. 3 is a view of the high-sensitivity MEMS-type z-axis vibration sensor packaged as a module according to an exemplary embodiment of the present invention.

Referring to FIG. 3, the MEMS-type z-axis vibration sensor according to an exemplary embodiment of the present invention is mounted on a TO-metal can type—or SMD-type package 310, adhered using conductive epoxy 330, and fixed by annealing.

Then, the MEMS-type z-axis vibration sensor according to an exemplary embodiment of the present invention is connected to a metal pad of the package 310 using a metal wire 350, and then tightly closed using an upper cap 370 by heating or laser welding in a certain vacuum state.

Since a high-sensitivity MEMS-type z-axis vibration sensor according to the present invention sensitively responds to weak vibration in a low frequency band, it can be applied to a seismograph, which senses a seismic wave of low frequency having a very small amount of vibration and a low vibration speed.

Moreover, since the high-sensitivity MEMS-type z-axis vibration sensor according to the present invention has a higher vibration sensitivity than MEMS-type z-axis vibration sensor of the same size, it can be useful in electronic devices that are gradually decreasing in size.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of fabricating a high-sensitivity MEMS-type z-axis vibration sensor, comprising:
   providing a silicon on insulator (SOI) substrate comprising an upper silicon layer disposed over a thermal oxide layer, and a silicon wafer disposed under the thermal oxide layer;
   doping the upper silicon layer with impurities to form a lower electrode;
   forming a silicon dummy ring in the doped upper silicon layer to define a center mass region of the doped upper silicon layer;
   forming a second upper oxide layer to a predetermined thickness and a polysilicon layer over the doped upper silicon layer;
   doping the polysilicon layer with impurities to form a center ground electrode;
   forming a sacrificial oxide layer and an upper electrode over the doped polysilicon layer;
   etching a lower surface of the silicon wafer to isolate the center mass region of the doped upper silicon layer; and
   etching the sacrificial oxide layer and the second upper oxide layer through an upper surface of the upper electrode, and forming a vibration space in which the doped polysilicon layer is capable of vibrating in a z-axis direction.

2. The method according to claim 1, wherein the upper silicon layer is doped with $POCl_3$.

3. The method according to claim 1, wherein forming the silicon dummy ring comprises:

forming a first upper oxide layer over the doped upper silicon layer and patterning the first upper oxide layer;

etching the doped upper silicon layer using the patterned first upper oxide layer as an etch mask to form the silicon dummy ring in the doped upper silicon layer; and removing the patterned first upper oxide layer using a fluoric acid aqueous solution.

4. The method according to claim 1, further comprising:

doping the second upper oxide layer with $POCl_3$;

forming a phosphosilicate glass (PSG) layer over the second upper oxide layer to increase an etch rate; and forming a third upper oxide layer over the PSG layer.

5. The method according to claim 1, wherein forming the polysilicon layer comprises:

forming a first nitride layer over the second upper oxide layer;

forming the polysilicon layer over the first nitride layer;

forming a second nitride layer over the doped polysilicon layer; and forming a first metal layer comprising titanium or platinum over the second nitride layer, wherein the polysilicon layer is doped with $POCl_3$.

6. The method according to claim 1, further comprising:

patterning the sacrificial oxide layer;

forming a second metal layer comprising titanium or platinum over the patterned sacrificial oxide layer; and forming a third metal layer comprising titanium or platinum over the upper electrode, wherein the upper electrode is formed by plating an upper surface of the second metal layer.

7. The method according to claim 1, wherein etching the silicon wafer comprises:

wet-etching the silicon wafer to expose the thermal oxide layer; and etching the exposed thermal oxide layer until the silicon dummy ring is separated from the doped upper silicon layer.

8. The method according to claim 1, further comprising:

vacuum packaging the structure obtained by the method of claim 1 in a transistor outline (TO) can-type or surface mount design (SMD)-type package.

\* \* \* \* \*